United States Patent
Lee et al.

(10) Patent No.: US 6,982,960 B2
(45) Date of Patent: Jan. 3, 2006

(54) PROTOCOL FOR SELF-ORGANIZING NETWORK USING A LOGICAL SPANNING TREE BACKBONE

(75) Inventors: Chung-Chieh Lee, Long Grove, IL (US); Lance E. Hester, Sunrise, FL (US); Robert J. O'Dea, Ft. Lauderdale, FL (US); Priscilla Chen, Sunrise, FL (US); Vernon A. Allen, Sunrise, FL (US); Monique J. Bourgeois, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 339 days.

(21) Appl. No.: 09/803,259

(22) Filed: Mar. 9, 2001

(65) Prior Publication Data

US 2003/0235158 A1    Dec. 25, 2003

(51) Int. Cl.
*H04L 12/28* (2006.01)
*H04Q 7/24* (2006.01)
*H04Q 7/00* (2006.01)

(52) U.S. Cl. ............... 370/254; 370/338; 370/395.31; 370/351; 370/331

(58) Field of Classification Search ............... 370/331, 370/332, 333, 328, 329, 255, 254, 256, 390, 370/392, 426, 389; 455/404.2, 421, 436
See application file for complete search history.

(56) References Cited

U.S. PATENT DOCUMENTS

| | | | |
|---|---|---|---|
| 5,740,366 A * | 4/1998 | Mahany et al. | 709/227 |
| 6,370,146 B1 * | 4/2002 | Higgins et al. | 370/400 |
| 6,385,174 B1 * | 5/2002 | Li | 370/252 |
| 6,456,599 B1 * | 9/2002 | Elliott | 370/254 |
| 6,791,949 B1 * | 9/2004 | Ryu et al. | 370/254 |
| 6,816,460 B1 * | 11/2004 | Ahmed et al. | 370/238 |
| 6,836,463 B2 * | 12/2004 | Garcia-Luna-Aceves et al. | 370/238 |
| 6,845,091 B2 * | 1/2005 | Ogier et al. | 370/338 |

* cited by examiner

*Primary Examiner*—Hanh Nguyen

(57) ABSTRACT

A network protocol for low-cost, low-power devices coupled to a self-organizing wireless network using a spanning tree backbone architecture is described. In this protocol, physical and logical network construction and maintenance operations, which supports efficient data routing in the network, are performed. The construction phase in conjunction with the maintenance phase insures the self-organizing capability of the network. At the same time, the maintenance operations provide a self-healing mechanism so that the network can recover from node failures and a self-updating mechanism so that the network can expand as more nodes enter the system. Also, the logical backbone hierarchy will facilitate multi-hop communication. The construction of a logical layered spanning tree backbone architecture from an underlying physical topology allows seamless data communication routing between all nodes in the network.

8 Claims, 12 Drawing Sheets

PROTOCOL FOR SELF-ORGANIZING NETWORK USING A LOGICAL SPANNING TREE BACKBONE

CROSS REFERENCE TO RELATED APPLICATION

This application is related to the applications entitled "System for Spread Spectrum Communication" Ser. No. 09/803,258, "A Multiple Access Protocol and Structure for Communication Devices in an Asynchronous Network" Ser. No. 09/803,322 and "System for Code Division Multi-Access Communication" Ser. No. 09/803,285, all filed on the same date as the present invention.

FIELD OF THE INVENTION

The present invention relates generally to wireless communication networks and more specifically to the use of a network protocol in wireless communication networks.

BACKGROUND OF THE INVENTION

Wireless communication networks often contain a great number of devices that can be randomly located throughout an indoor and/or outdoor communication environment. An important issue is how to organize these communication devices physically and logically so that efficient inter-device communication is possible, and so that the resulting network is robust, scalable, and adaptable to changes in network topology. A primary wireless networking technology currently in use is cellular telephony technology. This technology has weaknesses in the indoor environment, as well as in applications in which devices can be more efficiently connected to each other by communicating directly (i.e. the devices are in close proximity of each other).

Technologies that currently address these cases are wireless Personal Area Networks (PAN) and wireless home networking products. In the former, devices are organized into small networks designed to supplement current wide area networks such as cellular telephony. The networks allow a small number of devices to exchange data, and perform functions without the need for cable. Wireless home networking allows devices within a home to communicate with a central controller, normally a home computer or a cable set-top box. All devices in the network communicate directly with the central controller and not with each other. These networks are appropriate for their desired applications, but do not address the interconnection of multiple small low-cost and low-power wireless communication devices that may be scattered randomly throughout an indoor environment. These devices may be applied to remote sensing or control functions, signal processing, or communication functions. These devices require networks that are more scalable, robust to device failures, and employ efficient power conserving protocols.

In light of the foregoing, there is a need in the art for a network protocol for a self-organizing wireless network that provides physical and logical network construction, network routing, and network maintenance while addressing the issues associated with building a network around low-cost, low-power devices.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
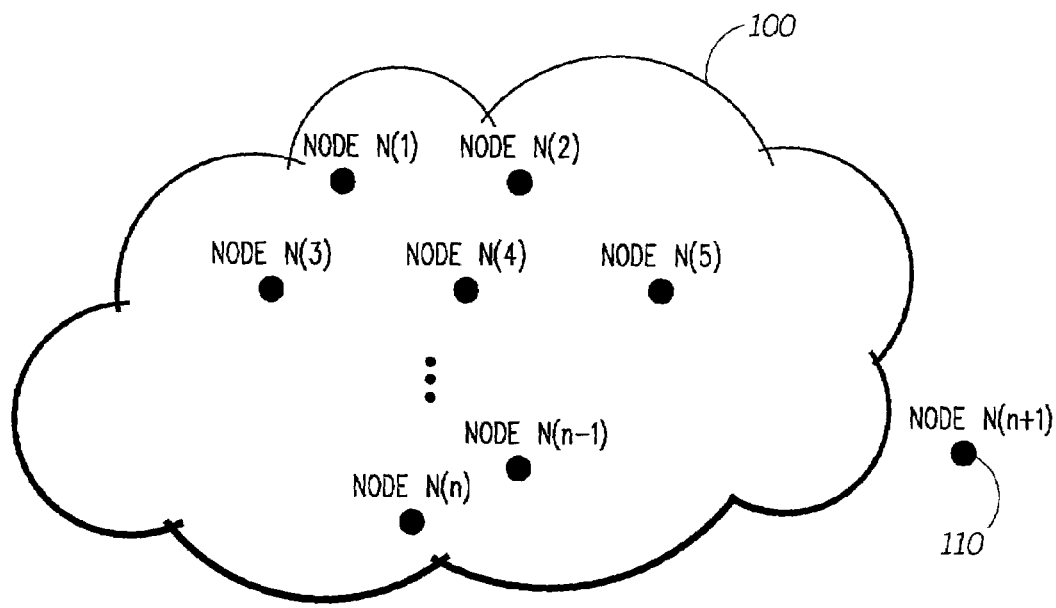
FIG. 1 shows a wireless communication network, according to the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

The present invention discloses a method and structure for low-cost, low-power devices coupled to a self-organizing wireless network using a spanning tree backbone architecture. The method and structure of the present invention may be described by examining the network protocol in terms of network construction, network routing protocols and network maintenance. The low-cost, low power devices are typically fixed, wireless communication devices. Note that wireless technology includes the use of optical and microwave communication techniques. Also, the self-organizing wireless network may contain mobile as well as fixed nodes, although a mobile node added to the network must move slowly enough so that the process of joining the network can be completed.

Referring to FIG. 1, a wireless network 100 is shown in which n nodes are distributed throughout network 100. An additional node N(n+1) 110 to be added to network 100 in accordance with the invention is also shown. Each node N(1), N(2), ..., N(n) of network 100 contains functionality sufficient to allow the node to send messages, receive messages, route data packets between nodes, facilitate multi-hop communications, store routing information, store neighboring node information, and supply an audio/visual indicator to a user of the network. Additional functionality may be incorporated into each node without departing from the spirit and scope of the invention.

Figure 2:
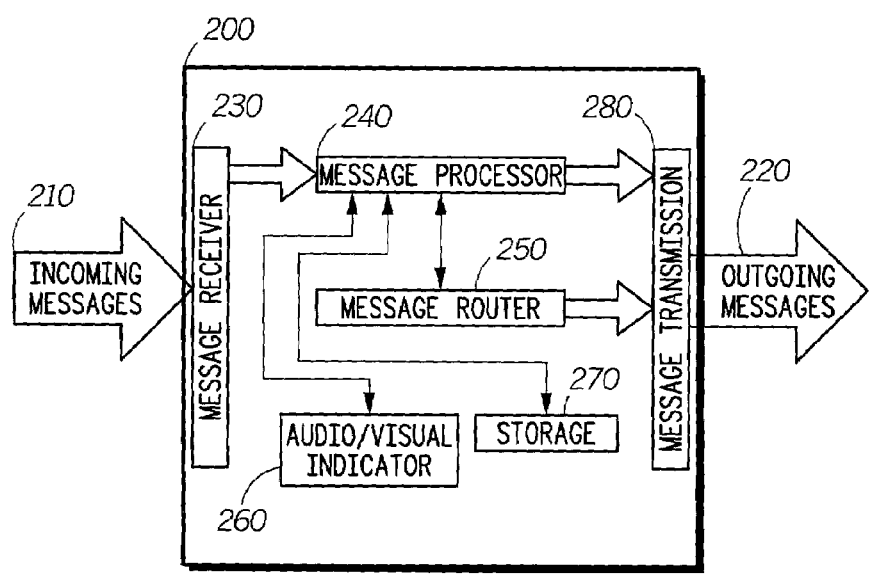
FIG. 2 shows an internal block diagram of a representative wireless communication device, according to the present invention.

Referring to FIG. 2, a block flow diagram of the internal operation of a node 200 of the nodes N(1), N(2), ..., N(n) contained in network 100 is shown. Node 200 could be any node of the N nodes contained in network 100. Incoming messages 210 are first received by message receiver 230, which then prepares the incoming messages 210 for processing by message processor 240. Message processor 240 interacts with storage block 270, audio/visual indicator 260, and message router 250 in order to correctly process incoming messages 210. Node 200 also contains message transmission 280 capability that allows node 200 to prepare outgoing messages 220 created by either message router 250 or message processor 240. The outgoing messages 220 could include status messages, routed data messages, messages to nodes within communication range of node 200, or any similar type of message traffic. Referring again to FIG. 2, note that while the functionality shown has been placed in separate blocks, the internal blocks shown could be further separated or combined in functionality without departing from the spirit and scope of the present invention.

Figure 3:
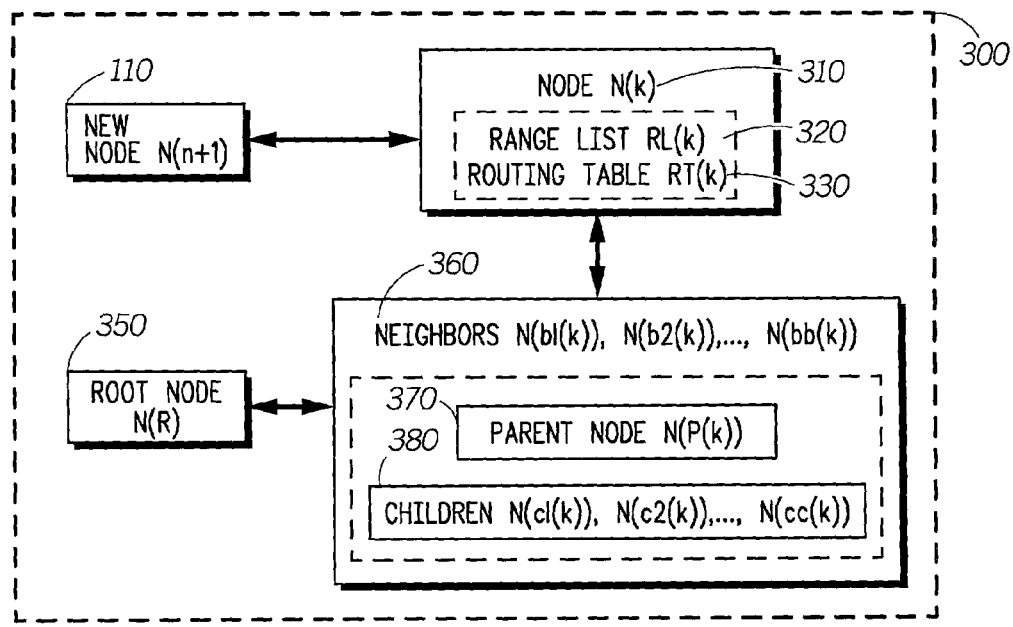
FIG. 3 shows the relationship between a node and it's neighbors in the wireless communication network, according to the present invention.

Referring now to FIG. 3, a representation 300 of that part of network 100 coupled to a typical node N(k) 310 is shown. Note that the k index of node N(k) indicates that node N(k) 310 could be any node of the nodes N(1), N(2), ..., N(n) contained in network 100. Node N(k) 310 contains, in addition to the functionality described in FIG. 2, a range list RL(k) 320, and a routing table RT(k) 330. RT(k) 330 and RL(k) 320 are stored in the memory of node N(k) 310, shown as storage 270 in FIG. 2. Range list RL(k) 320 contains information about nodes N(b1(k)), N(b2(k)), ..., N(bb(k)) 360 that are neighbors of node N(k) 310. This information may include neighbor ID, neighbor load information, neighbor children information, the parent node of each neighbor, and the depth of each neighbor from a root node of the network. The neighbor ID may be a logical address or a physical address. A neighbor is any node of the n nodes contained in network 100 that is within direct communication range of node N(k) 310. As indicated in FIG. 3, root node N(R) 350 may also be a neighbor of node N(k) 310, provided it is within communication range of node N(k) 310. Routing table RT(k) 330 contains information that enables node N(k) 310 to assist in the routing of a data packet from a source node N(s) to a destination node N(d).

Each node N(1), N(2), ..., N(n) in network 100 contains a parent node, with the exception of root node N(R) 350. There is one root node N(R) 350 in network 100, and every node N(1), N(2), ..., N(n) is a descendant of root node N(R) 350. The parent of node N(k) 310 is designated N(P(k)) 370.

Node N(k) 310 may also have one or more children nodes N(c1(k)), N(c2(k)), ..., N(cc(k)) 380 attached to node N(k) 310. Each node N(cx(k)) of N(c1(k)), N(c2(k)), ..., N(cc(k)) is a child node of node N(k) 310 if data routed from node N(cx(k)) must pass through node N(k) 310 in order to reach root node N(R) 350. A new node N(n+1) 110 that has not yet joined network 100 may also interact with node N(k) 310 in the process of joining network 100.

Figure 5:
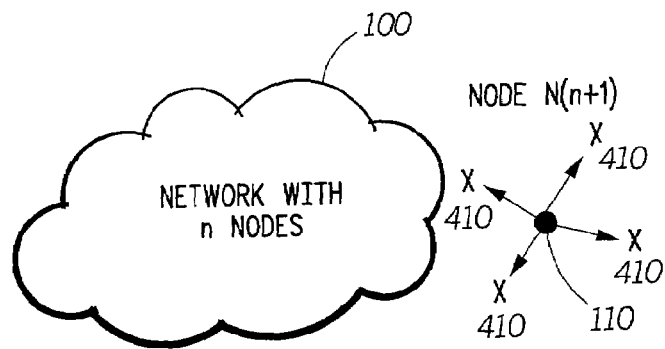
FIG. 5 shows a new node X hello message, according to the present invention.
Figure 6:
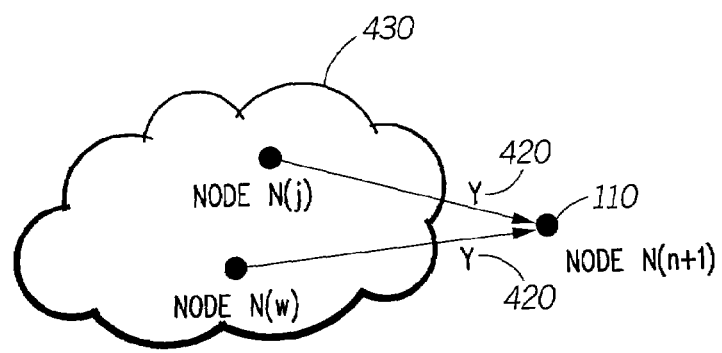
FIG. 6 shows the new node receiving Y reply messages, according to the present invention.
Figure 7:
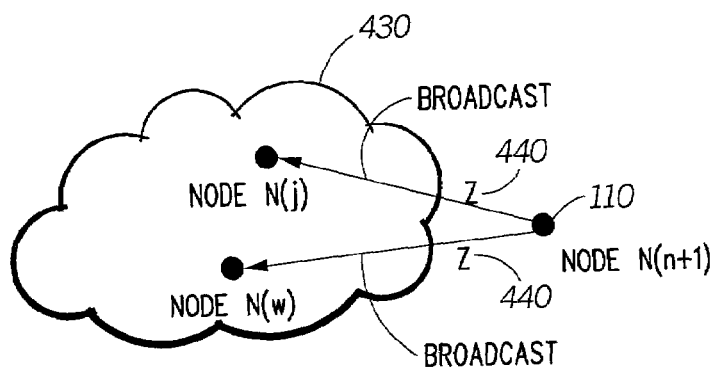
FIG. 7 shows the new node sending Z confirmation messages, according to the present invention.

Construction of network 100 begins with a physical topology construction process. Referring to FIGS. 4, 5, 6, and 7, the physical topology construction process for establishing communication between a new node N(n+1) to be added to the network and the existing, fixed nodes of the network N(1), N(2), ..., N(n) is illustrated. During physical topology construction, fixed wireless nodes N(1), N(2), ..., N(n) are deployed into network 100. A user adding node N(n+1) 110 to expand network 100 (block 450) is responsible for positioning node N(n+1) 110 so that it is within communication range of at least one other node connected to network 100. Node N(n+1)110 has an audio/visual display that indicates when node 110 is able to communicate with at least one of the fixed wireless nodes N(1), N(2), ..., N(n) already in the network. Referring now to FIG. 5, representative of block 453 of FIG. 4, network 100 with n nodes is shown as well as new node N(n+1) 110. Node N(n+1) 110 broadcasts X hello message 410 to each node of fixed wireless nodes N(1), N(2), ..., N(n) of network 100 that is within communication range of node N(n+1) 110. Referring now to FIG. 6 and block 456 of FIG. 4, one or more nodes N(j), ..., N(w) 430 of the fixed wireless nodes N(1), N(2), ..., N(n) reply to X hello message 410 with a Y reply message 420 informing node N(n+1) 110 that the one or more nodes N(j), ..., N(w) 430 are within communication range of node N(n+1) 110. If node N(n+1) 110 receives Y reply message 420 from any of the one or more nodes N(j), ..., N(w) 430, then node N(n+1) 110 adds the sending node of Y reply message 420 to the range list RL(n+1) of node N(n+1) 110 (block 459). Additional information can be added to the range list including, loading information, and depth to root. Y reply messages 420 are received by new node N(n+1) 110 for a period of time (block 462). If no Y reply message 420 is received by node N(n+1) 110 after a certain time (block 462), then the range list of node N(n+1) 110 will be empty (block 465), and an indicator 260 will alert the user. Node N(n+1) 110 must then be physically moved to a new location, corresponding to block 477 and the network topology construction process starts again with network expansion (block 450). Assuming at least one Y message was received (block 465), the parent node N(P (n+1)) of node N(n+1) 110 is selected (block 468). Parent node N(P(n+1)) is determined from the minimum depth m(n+1) from the root node of all nodes in the range list RL(n+1) 320 and the smallest load of the nodes having minimum depth m(n+1). Note that other selection criteria using specific loading information could be used without departing from the spirit and scope of the invention. The depth of node N(n+1) 110 is set to be the minimum depth m(n+1) plus one (block 471). Referring now to FIG. 7 and block 474 of FIG. 4, node N(n+1) 110 replies to each of the one or more nodes N(j), ..., N(w) 430 that sent Y reply message 420 with a broadcast Z confirmation message 440 confirming that the nodes are within range of each other (block 474). A broadcast Z message sends a confirmation to the one or more nodes that sent reply messages. A node may also send a Z message that is sent to only one other node, but with the same purpose. Broadcast Z confirm message 440 includes the new nodes address. If logical addressing is used, the new node address is a logical address containing the node N(n+1) 110 depth information and the parent's identity. After sending the broadcast Z confirmation message 440, node N(n+1) enters a maintenance mode (block 490), during which normal network operation occurs.

Figure 4:
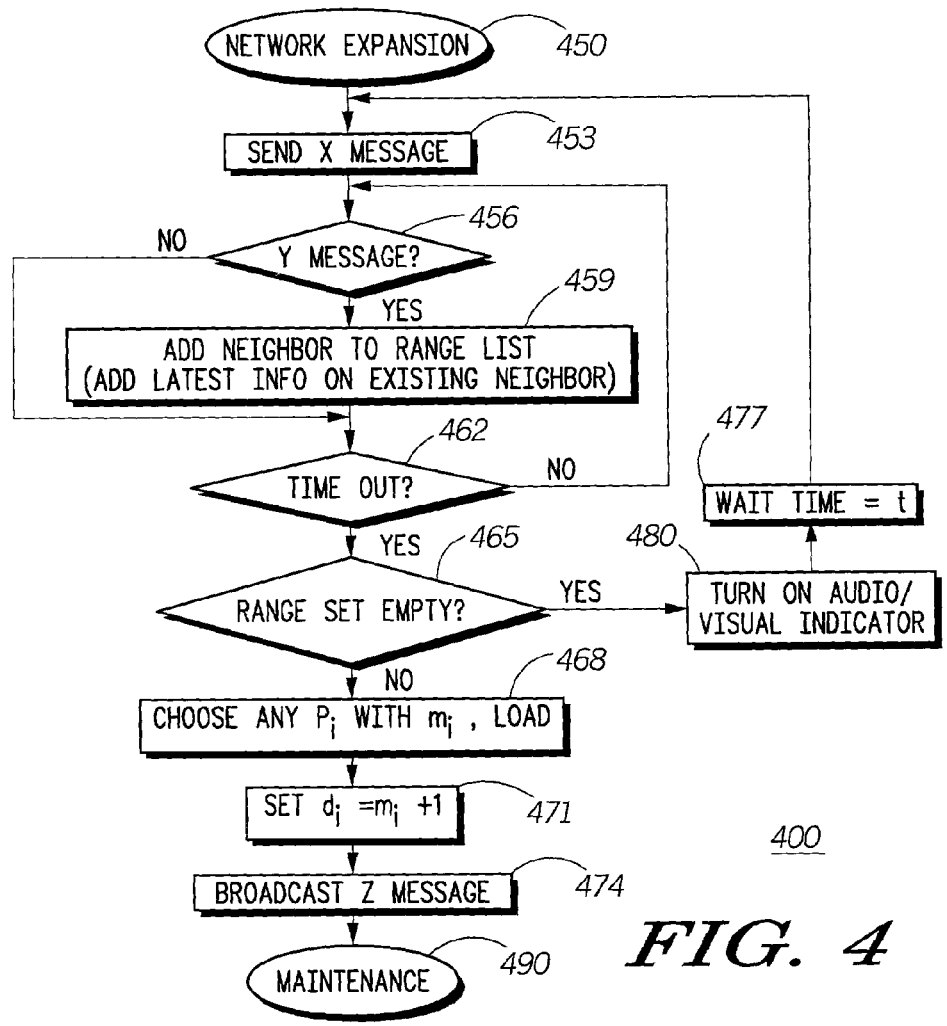
FIG. 4 is a flowchart of the network expansion process, according to the present invention.
Figure 8:
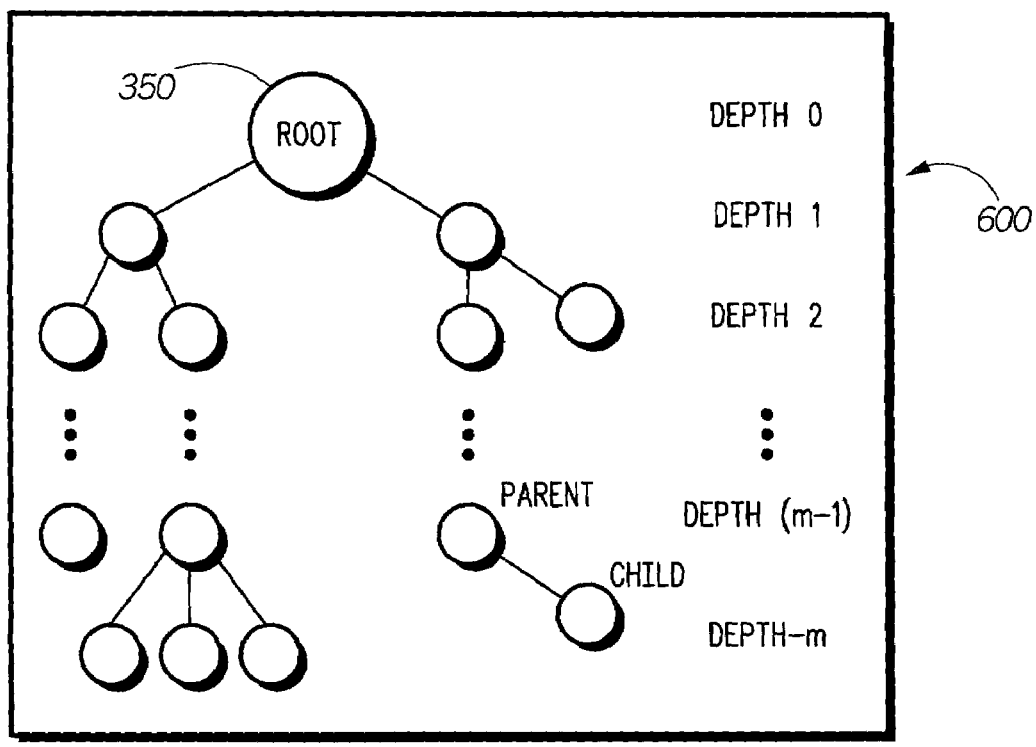
FIG. 8 illustrates the spanning tree structure of a wireless communication network, according to the present invention.

In addition to the network expansion process of network 100 illustrated in FIG. 4, the logical construction process of network 100 is performed, which is derived from the physical construction process. The logical construction process occurs when node N(n+1) 110, which has just completed physical construction process 400, is added to the logical spanning tree architecture of network 100. The logical construction derived using the logical construction process is a spanning tree derived from the underlying physical topology. Referring to FIG. 8, a representative spanning tree architecture is shown. The first node N(1) that starts the physical topology and the logical topology is designated Root node 350. Each additional node is added as a child of the Root node 350. Various addressing schemes may be used to uniquely locate a node within the spanning tree architecture. If logical addressing is used, then each node receives a unique address that includes information about the nodes neighbors and children within the network 100. Other types of addressing, such as fixed addressing do not contain any indication of the location of the node within network 100.

Note that if logical addressing is used, the logical address assignment can be done with the traverse tree or the non-traverse tree method, although the described procedure above suggests a traverse tree method. In the traverse tree method, the size of the network is determined a priori (how many layers, how many nodes in a layer), and logical addresses are then assigned to the nodes as they enter the network. In the non-traverse tree method, the physical topology of all the nodes in the network is decided first and logical addresses are then assigned to them according to their relative physical topology. A non-traverse tree has to wait until all nodes are entered into the network and the physical topology is constructed first; however it does not waste logical addresses like the traverse tree method.

Figure 9:
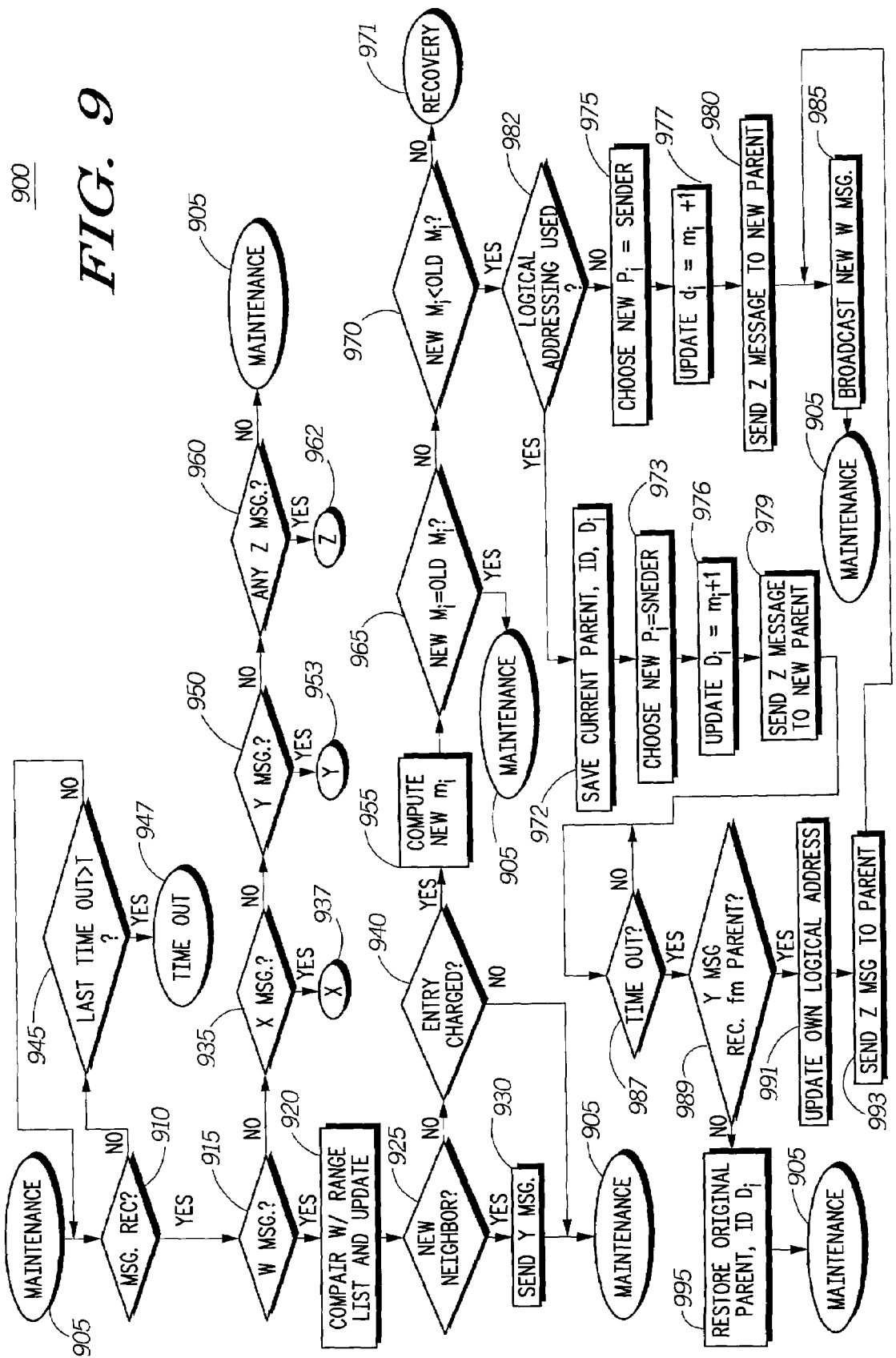
FIG. 9 is a flowchart showing the construction of the logical network, according to the present invention.

Referring now to FIG. 9, a flowchart illustrating the network maintenance mode 900 is shown. The maintenance mode 900 occurs during normal network operation when representative node N(k) 310 has already entered the network 100 and completed network expansion 450. The maintenance mode 900 begins at block 905 when node N(k) 310 checks to see if any messages have been received (block 910). If no messages have been received for a specified time T (block 945), then the time out mode (block 947) begins. Otherwise the maintenance mode 900 continues to check for and process any messages. Once an X, Y, broadcast Z, Z or W message has been received (block 910), the appropriate processing function is called. If an X hello message is received (block 935), then the X message process begins (block 937). If a Y reply message is received (block 950), then the Y reply message process begins (block 953). If a Z confirm or broadcast Z confirm message is received (block 960), then the Z confirm message process begins (block 962). The X, Y, broadcast Z, and Z messages have been introduced in the discussion of FIG. 4. The W update message is received periodically from neighbor nodes to update or confirm their status that may or may not affect other nodes in the network 100. If the message received is not an X, Y, broadcast Z, Z, or W message, then the maintenance cycle continues from block 905 and the unidentified message is not processed.

If a W update message is received (block 915), then node N(k) 310 compares the senders ID to the contents of the range list of node N(k) 310(block 920). If the sending node is a new neighbor (block 925), the node N(k) 310 sends out a Y reply message (block 930), and re-enters the maintenance mode 900 (block 905). If the sending node is not a new neighbor, and if the range list entry for that neighbor has not changed (block 940), node N(k) 310 again re-enters the maintenance mode (block 905). If the range list has changed (block 940), a new minimum depth m(k) is computed (block 955), and the new minimum depth is compared to the old minimum depth (block 965). If they are equal (block 965), then node N(k) 310 re-enters maintenance since the parent node does need to be changed. If the new m(k) is greater than the old m(k), then the node recovery mode (block 971) begins since the node N(k) 310 is now further from the Root node 350 than before.

Otherwise, the new m(k) is less than the old m(k) (block 970), and, if logical addressing is not used (block 982), the new parent is chosen to be the sending node (block 975). The depth of node N(k) 310 is set to be one plus m(k) (block 977), and a Z confirm message is sent to the new parent (block 980). Then a W update message is broadcast (block 985), and the node N(k) 310 re-enters the maintenance mode (block 905).

If the new m(k) is less than the old m(k) (block 970), and logical addressing is used (block 982), then the old parent information is stored (block 972), and the new parent is chosen to be the sending node (block 973). The depth of node N(k) 310 is set to be one plus m(k) (block 976), and a Z confirm message is sent to the new parent (block 979). A time out period is enforced (block 987), and node N(k) 310 checks if a Y reply message has been received from the newly selected parent (block 973). If no Y message is received before the time out, the original parent, ID and depth, d(k), are restored (block 995), and the node N(k) 310 re-enters the maintenance mode (block 905). If a Y message was received from the new parent prior to time out (block 987), node N(k) 310 checks the contents of the message to see if the destination address is the same one the receiving node N(k) 310 planned to use. If not, the receiving node N(k) 310 updates its own logical address to reflect the new address assigned to it by the parent (block 991), sends a Z confirm message to the new parent (block 993), a W update message (block 985), and the node N(k) 310 re-enters the maintenance mode (block 905).

Figure 10:
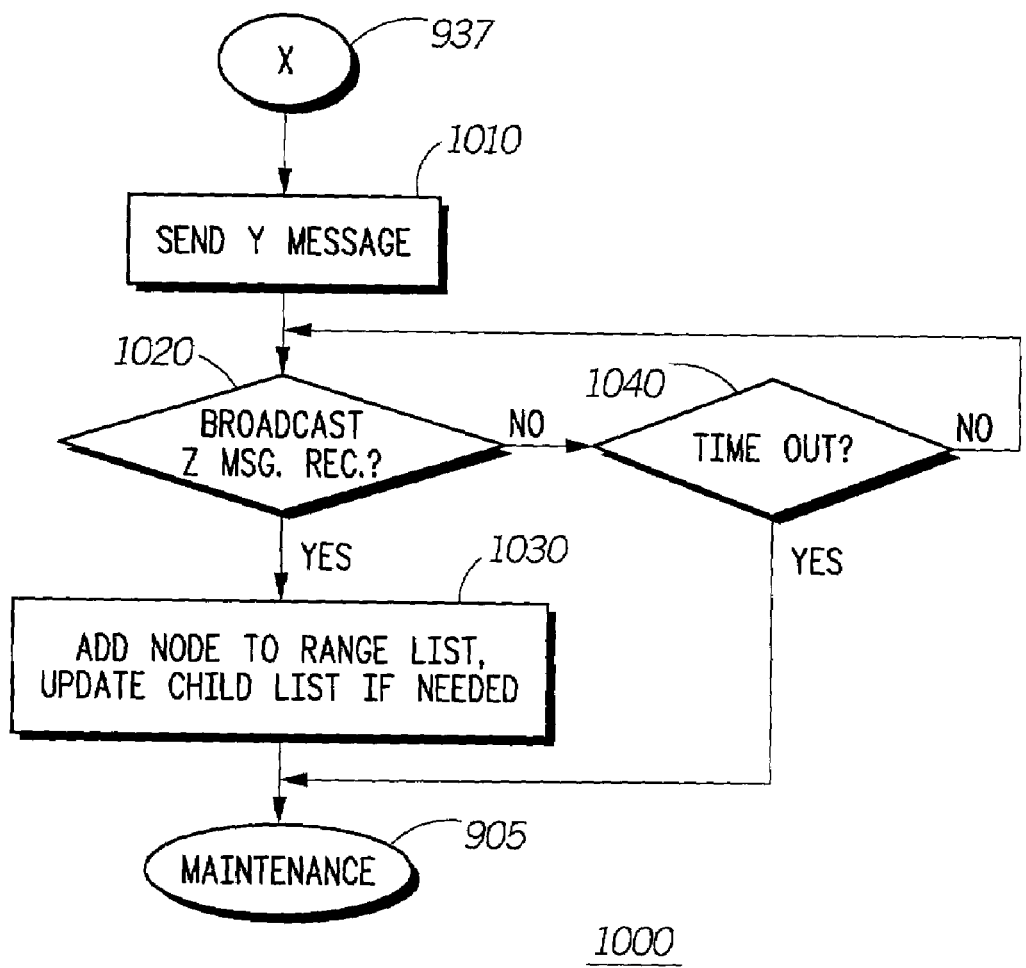
FIG. 10 shows the response of a node to an X hello message, according to the present invention.

One of the messages received during maintenance mode 900 is the X hello message. Referring to FIG. 10, receiving an X message during the maintenance mode 900 causes node N(k) 310 to send a Y message (block 1010), and wait for the expected broadcast Z message (block 1020). If a broadcast Z message has not been received by a specified time (block 1040), then the node takes no action and re-enters the maintenance mode 900 (block 905). If a broadcast Z message is received (block 1020), then the node that sent the X message is added to the range list of node N(k) 310, and the child list is updated if necessary (block 1030). Node N(k) 310 then re-enters the maintenance mode 900 (block 905).

Figure 11:
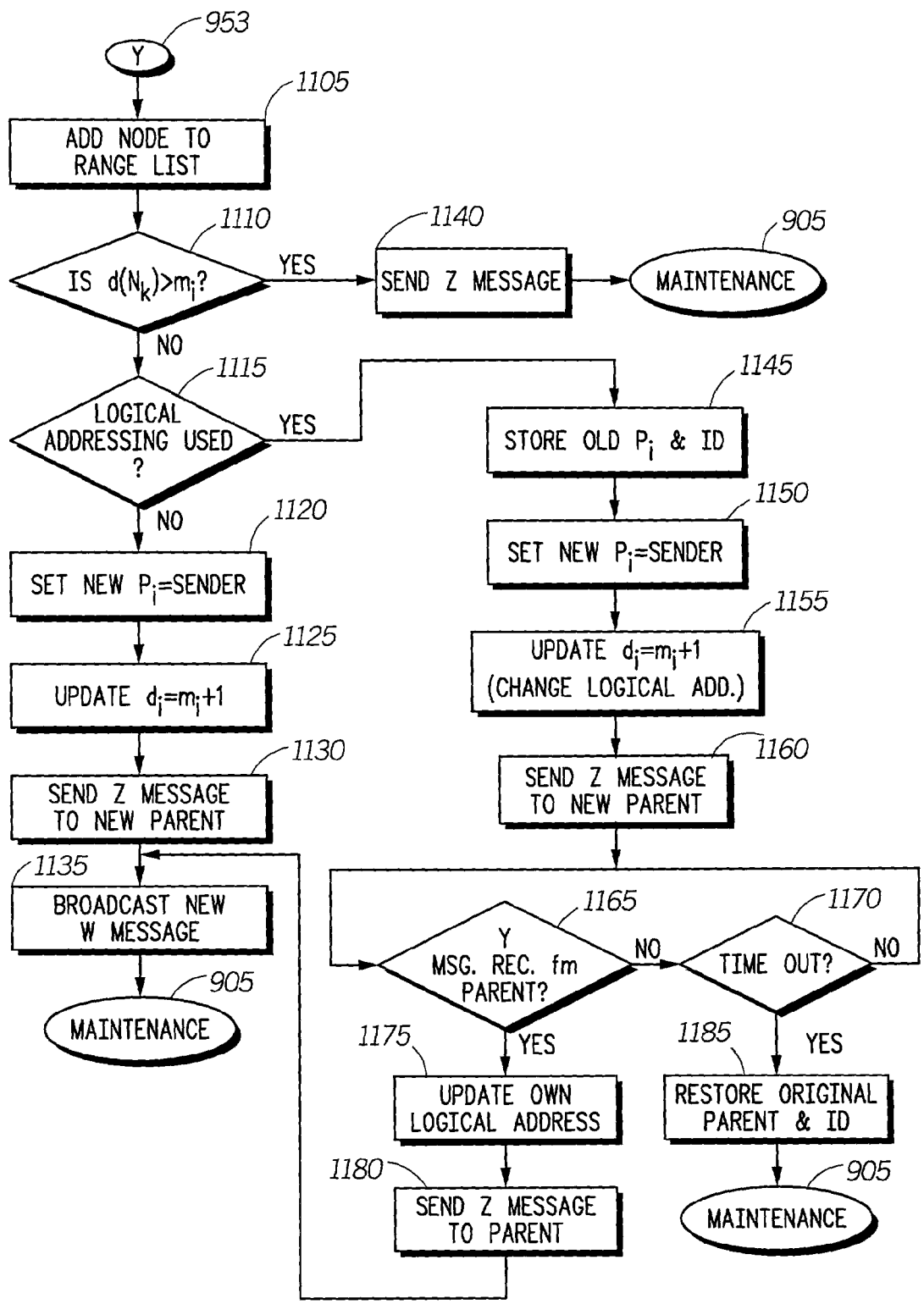
FIG. 11 is a flowchart for the response of a node to a Y reply message, according to the present invention.

Referring now to FIG. 11, the response of a node N(k) 310 in network 100 to a Y reply message received during maintenance 900 is shown. After receiving a Y message (block 953), node N(k) 310 adds the sending node to the range list of the receiving node (block 1105). If the depth of the sender is greater than or equal to the smallest depth of all the other nodes in the receiving node's range list (block 1110), then the receiving node does not need a new parent (block 1140). Send a Z message to the sending node (block 1140) and go to maintenance mode 900.

If the sending node is closer to the root than the current parent (block 1110), and logical addressing is not used (block 1115), set the new parent to be the sender (block 1120), and update the new depth of node N(k) 310 to be the minimum depth plus 1 (block 1125). Next, send a Z message to the new parent (block 1130), broadcast a new W update message (block 1135), and return to maintenance 900.

If logical addressing is used (block 1115), store the current parent's information (block 1145), and assign the sender to be the new parent (block 1150). Update the receiving node's depth and logical address accordingly (block 1155). Now a handshaking sequence must be executed to make sure another node has not already claimed the logical address chosen by the receiving node. The receiving node sends a Z message (block 1160), containing its proposed logical address, to the sender (the new parent). The receiving node must wait (block 1170) for a Y response from the new parent. If no response is received (block 1165), the receiving node cannot use the new parent. It must restore its original parent information (block 1185), and return to maintenance (block 905).

If a Y message is received from the parent (block 1165), the receiving node must use whatever logical address the parent sends for it in the Y message. The receiving node updates its logical address if necessary (block 1175), and sends a Z message to the new parent with the new agreed upon logical address (block 1175). The receiving node broadcasts a W message with its new information (block 1135) and goes to maintenance (block 905).

Figure 12:
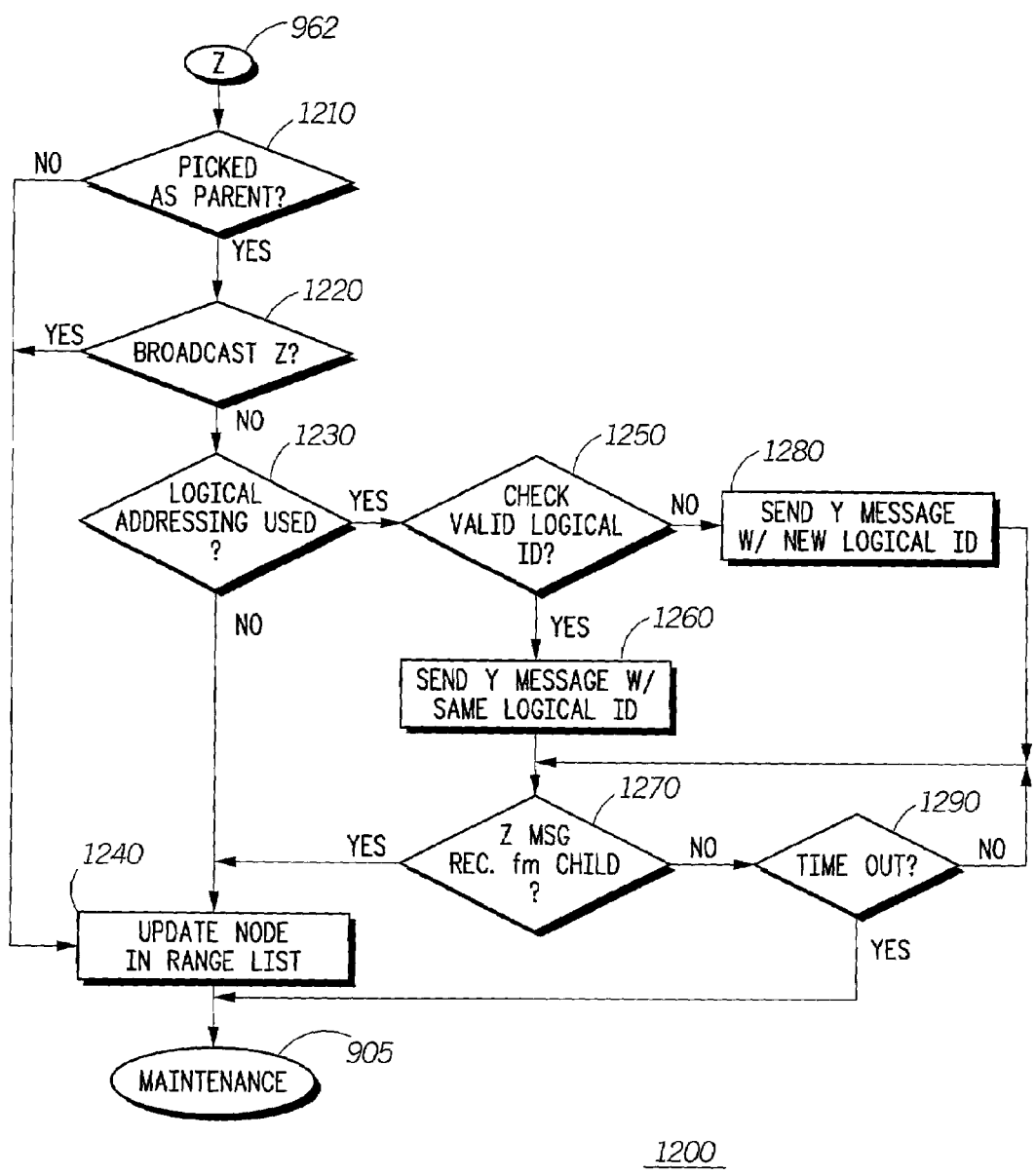
FIG. 12 is a flowchart for the response of a node to a Z confirm message, according to the present invention.

Referring now to FIG. 12, a Z message is received during maintenance (block 962). If the receiving node was not chosen as the sender's parent (block 1210), then update the node sending the Z message in the range list of the receiver (block 1240) and return to maintenance (block 905). If the receiving node was chosen as the sender's parent (block 1210), and a broadcast Z message was received (block 1220), update the node sending the Z message in the range list of the receiver (block 1240) and return to maintenance (block 905) Also, if the Z message is not a broadcast Z(block 1220), and logical addressing is not used, then update the node sending the Z message in the range list of the receiver (block 1240) and return to maintenance (block 905).

If the received message was a regular Z message (block 1220), and logical addressing is used (block 1230), make sure the new child node has chosen a valid logical address (block 1250). If the address is valid, send a Y message to the child using the same address (block 1260). If some other node has already taken the address, choose a new logical address for the new child and include it in a Y message (block 1280). In either case of block 1250, wait for a Z message from the child as confirmation (block 1270). If no Z message is received within a specified time out period (block 1290), do not update the sending node's information in the range list. Return to maintenance (block 905).

If a Z message is received (block 1270), update the receiving node's range list to include the sender's information (block 1240), and return to maintenance (block 905).

Figure 13:
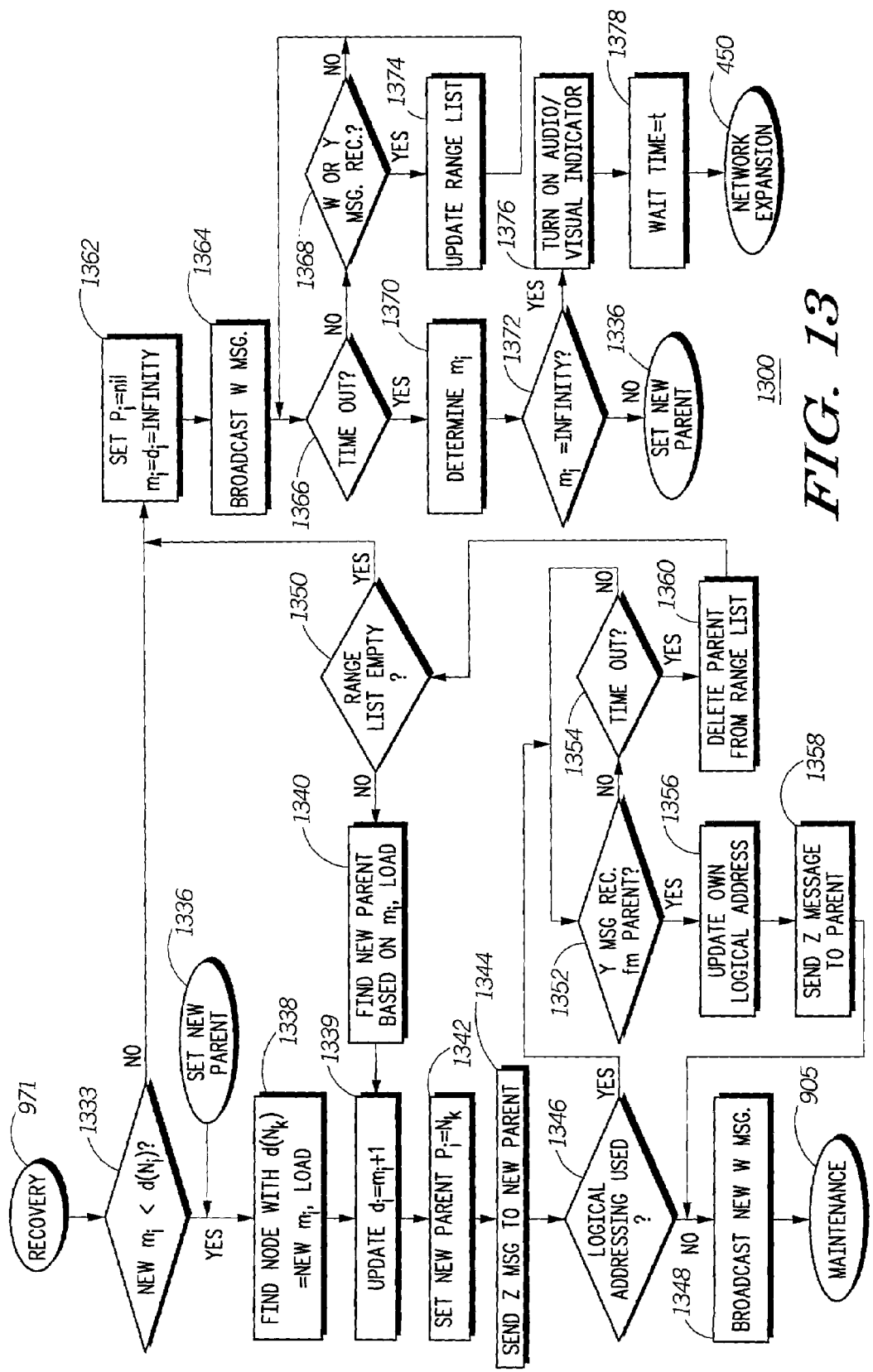
FIG. 13 is a flowchart illustrating the node recovery process, according to the present invention.

Referring now to FIG. 13, a flowchart illustrating how a node recovers from a change in network topology is shown. Upon entering recovery (block 971), compare the new minimum depth value, mi, with the node's own depth (block 1333). Remember that, under normal circumstances, the node's depth should be one greater than the minimum depth. That is, the parent node should be closer to the root than the child node.

If the minimum depth is less than the node's depth, find a new parent based on minimum depth from the root, and use the loading information as a tiebreaker if necessary (block 1338). Set the new parent (block 1342), and send a Z message to the prospective parent (block 1344). If logical addressing is not used, simply broadcast a W update message informing neighbors of the new parent (block 1348), and return to maintenance (block 905). If logical addressing is used, wait for a Y message from the prospective parent (block 1352).

If the Y message is received, make sure that the child node uses the logical address sent by the parent in the contents of the Y message (block 1356). It is important that only one node uses that address. Send the Z message with the agreed upon logical address (block 1358), and broadcast a W message with the child's new information (block 1348). Return to maintenance (block 905).

If no Y message is received from the prospective parent (block 1352) after a specified time out period (block 1354), do not use that node as a parent, because there was no agreement. Instead, delete the parent from the range list (block 1360), and check to see if range list is empty. If the range list is not empty, find a new parent based upon minimum depth and load (block 1340), and return to block 1342. This process continues until an appropriate parent is found or the range list is empty (block 135). If the range list is empty (block 135), set the parent to nil, and set the minimum depth, mi, and the node's own depth, di, to infinity (block 1362). Send a W message with this new information (block 1364). Wait for W or Y messages to be received from other nodes in the network (block 1368). For every W or Y message received, add the sending node to the range list (block 1374). Repeat block 1368 until a time out is reached (block 1355).

After the timeout period (block 1366), determine minimum depth again (block 137). If it is still infinity (block 1372), the node is disconnected since no W or Y messages were received. A user may turn on audio/visual indicator 260 (block 1376), and wait for a period of time (block 1378) before going to network expansion mode (block 450) to try to reconnect. If the minimum depth is not infinity, go to block 1336 to choose a new parent.

Figure 14:
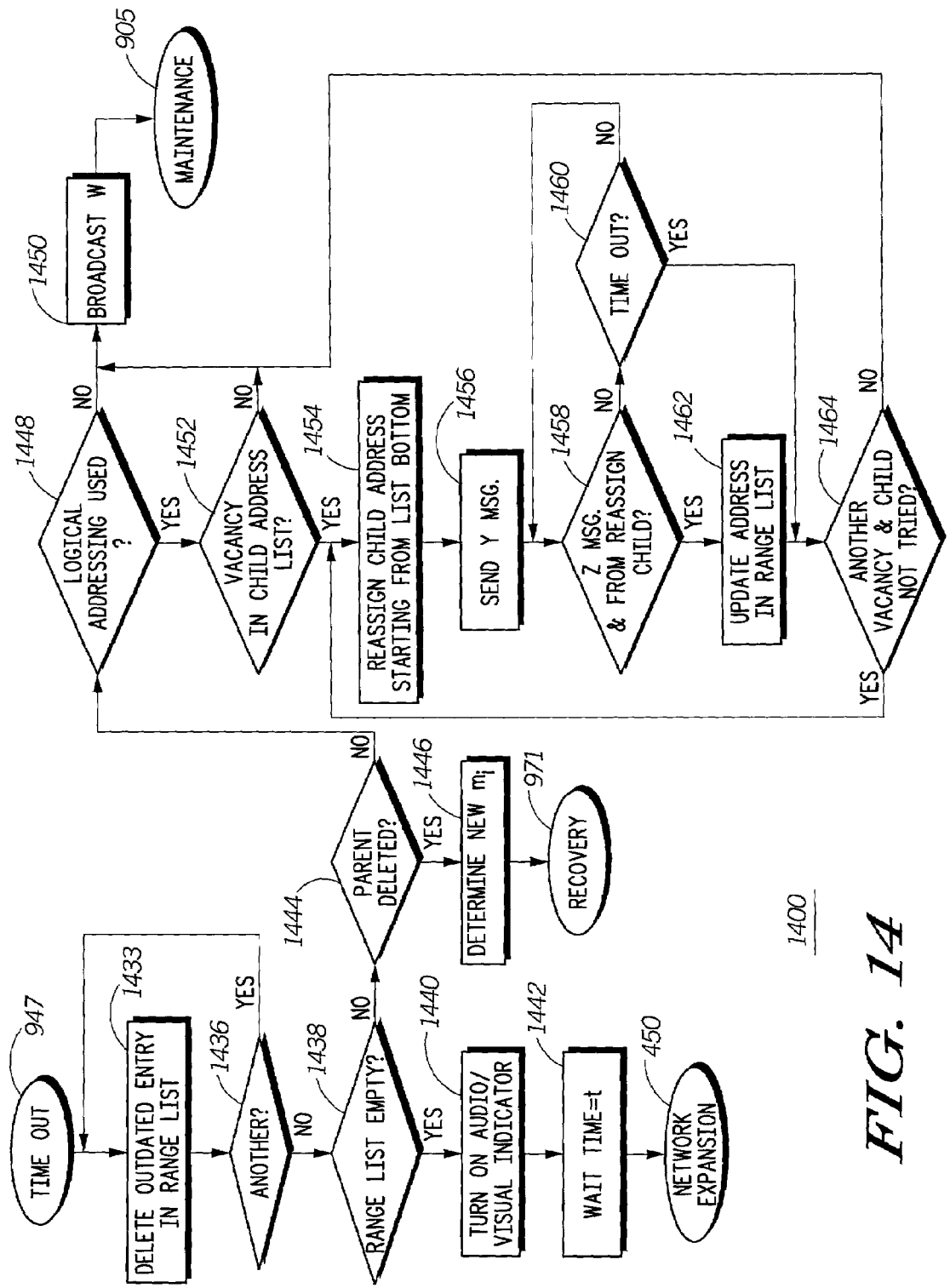
FIG. 14 is a flowchart illustrating the process a node goes through when it has not received a message for a long period of time, according to the present invention.

Referring now to FIG. 14, the flowchart for the time out mode is shown. The time out mode begins (block 947) when no messages are waiting to be processed and it has been more than a specified period of time since the last time out occurred. Any entries in the range list that correspond to nodes that have not been heard from in a specified amount of time are deleted (block 1433 and block 1436)). That is, the receiving node has not gotten a W message from a neighbor node within a specified time. If the range list is empty (block 1438), the node is no longer part of the network. Turn on audio/visual indicator 260 (block 1440), and wait for a period of time (1442) before going to network expansion (block 45).

If the range list is not empty but the parent has been deleted, determine a new minimum depth (block 1446), and go to recovery (block 971).

If the range list is not empty, the parent is still in the range list (block 1444), and logical addressing is not used (block 1448), send out a broadcast W update message (block 1450) and return to maintenance (block 905).

If logical addressing is used (block 1448), update the child node logical address list, if necessary (block 1452). If the child node logical address list is up to date, go to block 1450. Otherwise, take the child node at the bottom of the list, which is the largest value in the logical address field, and give it the logical address corresponding to the vacancy with the smallest value in the logical address field (block 1454).

Each time an address is changed, the parent must send out a Y message letting the child know of its new address (block 1456). If a Z message is received from the child (block 1458), change the child's address in the range list (block 1462). If a Z message is not received (block 1458) within a specified time out period (block 1460), do not change the child's address in the range list, because the child has not acknowledged the change. For each vacancy in the child list, the reassignment process starting at block 1454 is repeated (block 1464). When there is a vacancy and all children have been tried (block 1464), send a W message (block 1450). The flow next goes to maintenance (block 905).

Figure 15:
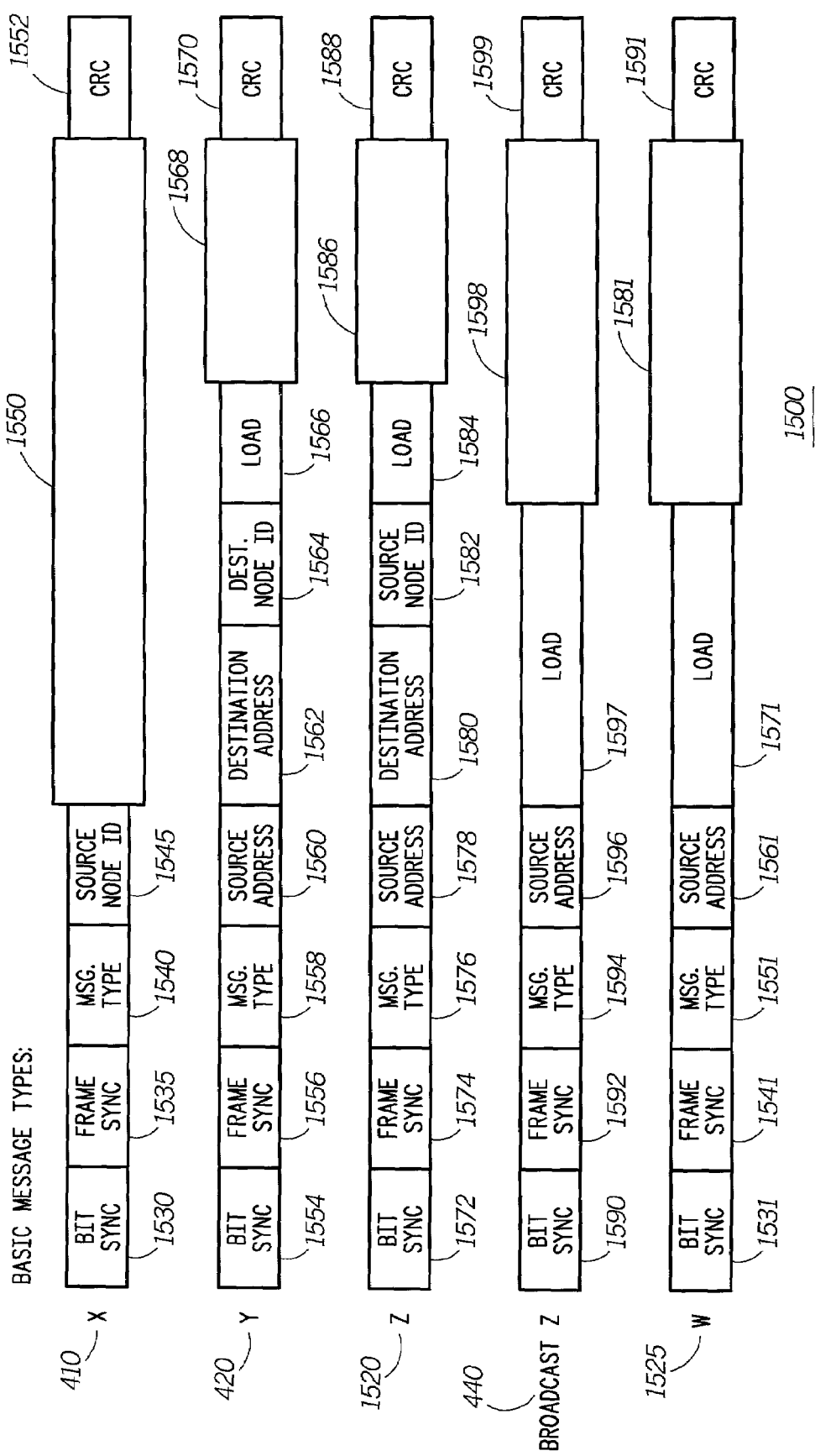
FIG. 15 shows the format of the X Hello, Y Reply, Z confirm, Z broadcast, and W update message, according to the present invention.

Referring now to FIG. 15, the format of the X, Y, Z, Broadcast Z, and W messages are shown. Each message contains network topology information that allows nodes within the network to determine a location within the spanning tree architecture that is as close as possible to the root node while still accounting for parent, child and loading information.

The X hello message 410 contains the following fields: Bit Sync (1530), Frame Sync (1535), Message Type (1540), Source Node ID (1545), an optional field (1550), and a CRC field (1552).

The Y reply message 420 contains the following fields: Bit Sync (1554), Frame Sync (1556), Message Type (1558), Source Address (1560), Destination Address (1562), Destination Node ID (1564), a Load Field (1566), an optional field (1568), and a CRC field (1570).

The Z reply message 1520 contains the following fields: Bit Sync (1572), Frame Sync (1574), Message Type (1576), Source Address (1578), Destination Address (1580), Source Node ID (1582), a Load Field (1584), an optional field (1586), and a CRC field (1588).

The Broadcast Z confirm message 440 contains the following fields: Bit Sync (1590), Frame Sync (1592), Message Type (1594), Source Address (1596), a Load Field (1597), an optional field (1598), and a CRC field (1599).

The W update message 1525 contains the following fields: Bit Sync (1531), Frame Sync (1541), Message Type (1551), Source Address (1561), a Load Field (1571), an optional field (1581), and a CRC field (1591).

The Bit Sync and Frame Sync have the same definition for each message type, and allow each node to perform synchronization on incoming messages. This synchronization can occur at the frame level and at the bit level.

The Message Type is also the same for each message. The message type lets the receiving node know which type of message is coming in so that the receiving node will be able to understand the rest of the message.

Each message also contain an optional field, which is currently not used. Note that the size of this field varies between message types.

The CRC field is also present in each message type. This field allows received packets to be checked for errors.

For the X hello message 410, the source node ID (1545) is randomly selected. Each node will have a random ID, which is necessary for the case when a Y message is sent to a new node (in response to an X message). Because a new node does not yet have an assigned logical address, there must be some other node ID to identify for whom the Y message is intended.

For the Y reply message 420, if the source address is the logical address of the sending node; if logical addressing is not used in the network, the source address can just be a random ID. The destination address contains the proposed logical address of the receiving node. In other words, this will be the logical address of the receiving node if the sending node is chosen as the receiving node's parent. The destination node ID is the random node ID, as described for the X message, of the receiving node. The Load field currently contains the number of neighbors that the sending node currently has in its neighbor list. This can be used as a loading parameter in a future protocol version.

For the Z confirm message 1520, the source address is the same as for Y message. The destination address may contain the logical address of the receiving node; again, if logical addressing is not used in the network, the destination address may be a random ID. The source node ID has the same definition as the source node ID in the X Hello message 410. The Load field currently contains the number of children of the sending node and the number of neighbors of the sending node. This parameter can be used for load balancing.

For the broadcast Z confirm message 440, the source address is the same as for Y message. The Load field is the same as for Z message.

For the W message 1525, the source address is the same as for Y message. The Load field is the same as for Z message.

Figure 16:
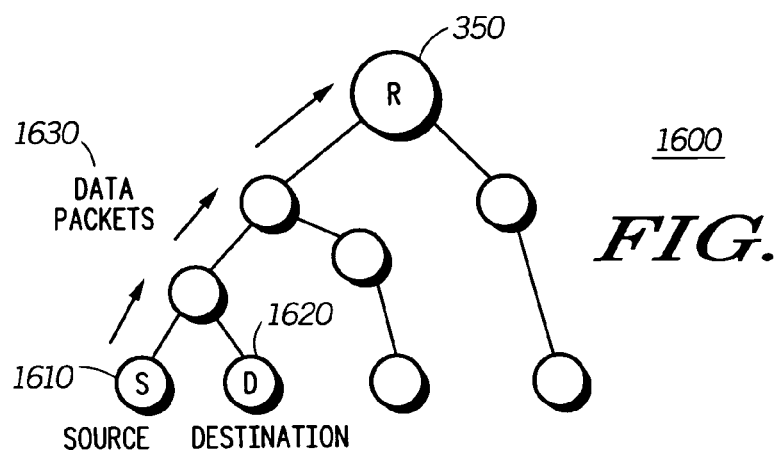
FIG. 16 shows an example of routing a message upstream when the destination is not on the direct path to the root node, according to the present invention.
Figure 18:
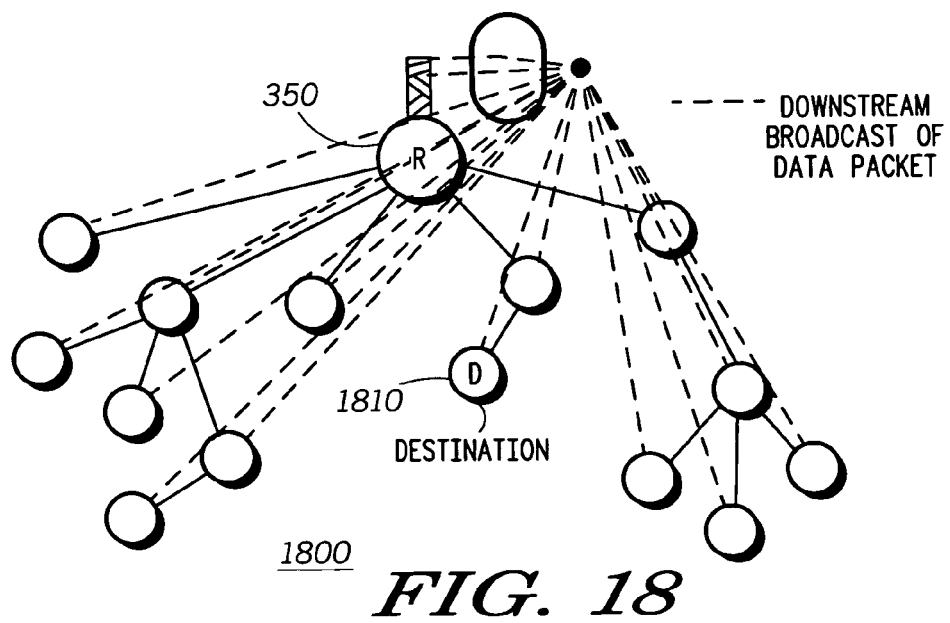
FIG. 18 shows how the root node uses message broadcasting to route a source message to a destination, according to the present invention.

Each fixed node of the fixed wireless nodes of the network maintains a simple routing table containing the fixed node's range, the fixed node's depth, its parent, and the fixed node's load parameter. Shortest path routing is not performed by any fixed node of the fixed wireless nodes N(1), N(2), . . . , N(n). Mobile wireless nodes may exist in the network 100, but fixed nodes perform message routing. Messages from a source node to a destination node within network 100 can travel through the network 100 from the source node to Root node N(R) 350, then down to reach the destination node in several ways. Referring now to FIG. 16, a spanning tree logical backbone hierarchy 1600 is shown in which source node 1610 and destination node 1620 are labeled. Note that destination node 1620 is not in the upstream path. A message 1630 from source node 1610 sent to destination node 1620 is transferred from node to node so that each successive transfer brings the message one hop closer to Root node N(R) 350. This node hopping continues until the message reaches Root node N(R) 350. Referring now to routing protocol 1800 of FIG. 18, Root node N(R) 350 then broadcasts this message to each node of the fixed wireless nodes N(1), N(2), . . . , N(n) in network 100. Alternatively, Root node N(R) 350 can use source routing or multi-hop local broadcasting to transmit the message from Root node N(R) 350 to destination node 1810.

Figure 17:
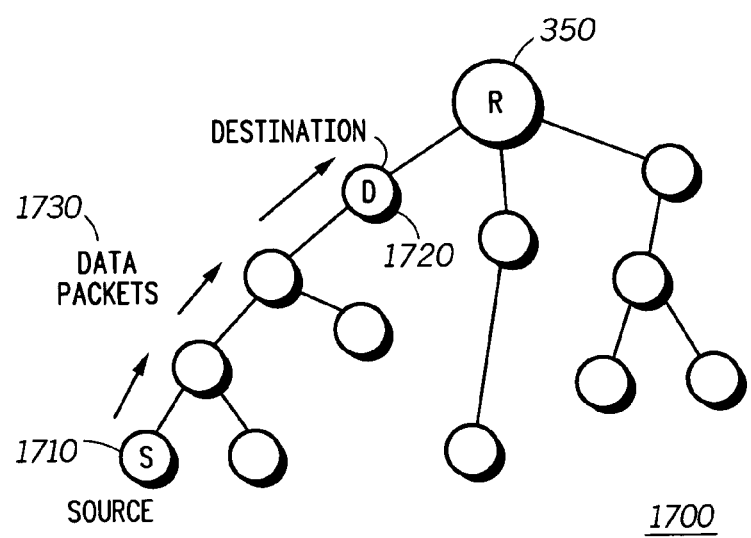
FIG. 17 shows an example of routing a message upstream when the destination is on the direct path to the root node, according to the present invention.

FIG. 17 illustrates a spanning tree logical backbone hierarchy 1700 in which source node 1710 and destination node 1720 are in the upstream path. In FIG. 17, a message sent from source node 1710 to destination node 1720 is transferred from node to node so that each successive transfer brings the message one hop closer to Root node 350 N(R). Prior to reaching Root node 350 N(R), destination node 1720 is reached. Since the message has arrived at destination node 1720, Root node 350 N(R) is not involved, and no broadcast message is required.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of maintaining a physical topology of a network, having a plurality of network nodes, and a logical topology representative of the physical topology, comprising:
   a first network node receiving a first update message from a second network node of the plurality of network nodes within one hop of the first network node; and
   if the second network node is not in a range list of the first network node and therefore a new neighbor of the first network node, updating the range list of the first network node to include the second network node;
   wherein updating the range list of the first network node to include the second network node comprises:
   the first network node transmitting a first reply message to the second network node;
   the second network node receiving the first reply message from the first network node and adding the first network node to the range list of the second network node;
   the second network node transmitting a first confirmation message to the first network node containing network topology information about the second network node; and
   the first network node receiving the first confirmation message from the second network node and adding the second network node to the range list of first network node wherein in response to the second network node receiving the first reply message and prior to the second network node transmitting the first confirmation message, further comprising:
   determining if a depth of the first network node from the root node is less than a minimum depth of an existing parent node of the second network node;
   if the depth of the first network node from the root node is less than the minimum depth of the existing parent node of the second network node, further comprising:
   determining if logical addressing is used in the network;
   if logical addressing is not used further comprising:
      assigning die first network node as a new parent node of the second network node;
      the second network node transmitting a second confirmation message to the first network node;
      the second network node transmitting a second update message to the plurality of network nodes containing information about the new parent node of the second network node;
   if logical addressing is used, further comprising:
      storing a logical address and an identifier of an old parent node of the second network node;
      assigning the first network node as the new parent node of the second network node;
      the second network node transmitting a second confirmation message to the first network node;
      if the second network node receives a second reply message from the first network node in response to the second confirmation message, comprising:
         the second network node updating a logical address of the second network node;
         the second network node transmitting a third confirmation message to the first network node;
         the second network node transmitting a second update message;
      if the second network node does not receive the second reply message from the first network node in response to the second confirmation on message within a first time-out period, the second network node restoring the old parent node as parent of the second network node; and
   if the depth of the first network node from the root node is not less than the minimum depth of the parent node of the second network node, the second network node transmitting the confirmation message.

2. A method of maintaining a physical topology of a network, having a plurality of network nodes, and a logical topology representative of the physical topology, comprising:
   a first network node receiving a first update message from a second network node of the plurality of network nodes within communication range of the first network node;
   if the second network node is contained within the range list of the first network node, then;
   determining whether information contained in the first update message about the second network node matches information contained in the range list of the first network node about the second network node;
   if the information contained in the first update message about the second network node does not match information contained in the range list of the first network node about the second network node, using the information contained the first update message about the second network node and the range list of the first network node to determine if an old parent node of the first network node provides the first network node with a minimum depth from a root node of the network and updating the first network node to have a new parent node if the old parent node does not provide the minimum depth from the root node; and
   wherein the range list comprises routing information for only those nodes that are within one hop of the node;
   wherein if the information contained in the first update message about the second network node does not match information contained in the range list of the first network node about the second network node, further comprising:
   using the information contained in the first update message about the second network node and information contained in the range list of the first network node to determine a new minimum distance of the plurality of network nodes from the root node;
   if the new minimum distance is less than an old minimum distance of the plurality of network nodes from the root node, further comprising:
   assigning the second network node as a new parent node of the first network node;
   the first network node transmitting a first confirmation message to the second network node containing a new depth of the first network node from the root node with the second network node as the new parent node;
   determining if logical addressing is used in the network;
   if logical addressing is not used, further comprising:
      the first network node transmitting a second update message to the plurality of network nodes containing information about the new parent node of the first network node;
   if logical addressing is used, further comprising:
      determining whether the first network node has received a first reply message from the second network node;
      if the first network node has not received the first reply message from the second network node, restoring a logical address and an identifier of the old parent node to the range list of the first network node; and
      if the first network node has received the first reply message from the second network node, the first network node updating a logical address of the first network node, transmitting a second confirmation message to the second network node;

if the new minimum distance is greater than the old minimum distance from the root node, entering a recovery mode to assign the new parent node of the first network node.

3. The method of claim 2, wherein the recovery mode further comprises:

determining whether the new minimum distance of the plurality of network nodes from the root node is less than a depth of the first network node from the root node;

if the new minimum distance from the root node is less than a depth of the first network node from the root node, further comprising:

identifying a network node of the plurality of network nodes having the new minimum distance;

assigning the network node as the new parent node of the first network node;

the first network node transmitting a first confirmation message to the new parent node;

determining whether the network uses logical addressing;

if the network uses logical addressing, further comprising:

if the first network node has received a first reply message from the new parent node in response to the first confirmation message, the first network node updating a logical address of the first network node and transmitting a second confirmation message to the new parent node;

if the first network node has not received the first reply message from the new parent node, further comprising:

deleting the new parent node from the range list of the first network node;

determining whether the range list of the first network node is empty;

if the range list of the first network node is not empty, determining a second new parent node for the first network node based upon the minimum depth of the plurality of network nodes;

the first network node transmitting a second update message containing information about the new parent node of the first network node;

if the new minimum distance from the root node is not less than a depth of the lint network node from the root node or if the range list of the first network node is empty, further comprising:

setting the new parent node of the first network node to nil, the minimum depth of the plurality of network nodes to infinity, and the depth of the first network node from the root node to infinity;

the first network node transmitting a second update message containing information about the settings of the new parent node, the minimum depth, and the depth of the first network node;

if a third update message or a third reply message is received by the first network node from a third network node during a third time-out period, the first network node updating the range list of the first network node to include the third network node;

determining a new minimum depth of the plurality of network nodes;

if the new minimum depth is equal to infinity, activating a disconnect indicator of the first network node; and if the new minimum depth is not equal to infinity, determining the new parent of the first network node.

4. The method of claim 3, wherein if the new minimum distance from the root node is less than the depth of the first network node, identifying the network node having the new minimum distance and having a minimum load value of the plurality of network nodes.

5. The method of claim 3, wherein deleting the new parent node from the range list of the first network node occurs after a second time-out period.

6. A method of maintaining a physical topology of a network, having a plurality of network nodes, and a logical topology representative of the physical topology, comprising:

a first network node of the plurality of network nodes receiving a reply message from a second network node of the plurality of network nodes that is within communication range of the first network node; and the first network node adding network topology information of the second network node to a range list of the first network node, wherein the range list comprises routing and topological information for only those nodes that are within one hop of the node;

if a depth of the first network node from a root node of the network is greater than or equal to a minimum depth of the plurality of network nodes from the root node, the first network node transmitting a confirmation message to inform the second network node;

if the the of the first network node from the root node of the network is less than the minimum depth of the plurality of network nodes from the root node, further comprising:

if the network does not use logical addressing, comprising:

assigning the second network node as a new parent node of the first network node;

the first network node transmitting a second confirmation message to the second network node; and the first network node transmitting a second update message to the plurality of network nodes containing information about the new parent node of the first network node;

if the network does use logical addressing, further comprising:

storing a logical address and an identifier of an old parent node of the first network node;

assigning the second network node as the new parent node of the first network node;

the first network node transmitting a second confirmation message to the second network node;

if the first network node receives a second reply message from the second network node in response to the second confirmation message comprising:

the first network node updating a logical address of the first network node;

the first network node transmitting a third confirmation message to the second network node; and the first network node transmitting a second update message;

if the first network node does not receive the second reply message from the second network node in response to the second confirmation message within a first time-out period, the first network node restoring the old parent node as parent of the first network node and transmitting a second update message.

7. A method of maintaining a physical topology of a network, having a plurality of network nodes, and a logical topology representative of the physical topology, comprising:

- a first network node of the plurality of network nodes receiving an update message containing network topology information of a second network node of the plurality of network nodes within communication range of the first network node;
- adding the network topology information of the second network node to a range list if the network topology information is not contained within the range list;
- if a depth of the second network node is different from the stored value in the first network node's range list, the depth value of the second network node in the first network node's range list is updated; further comprising:
- re-computing the minimum depth of the first network node, taken into account the new depth value of the second network node, to create a new minimum depth of the first network node;
- if the new minimum depth is less than the original minimum depth, selecting the second network node as a parent of the first network node and updating network topology information of the first network node;
- if the new minimum depth of the first node is greater than its original minimum depth, entering a recovery mode, wherein the recovery mode further comprises:
- if an attempt to identify a third network node having a minimum depth to a root node of the network is successful, assigning the third network node as the parent of the first network node and updating network topology information of the second network node; and
- if the third network node cannot be identified, activating a failure indicator of the first network node.

8. The method of claim 7, wherein the network topology information comprises depth, loading, and identifier information.

* * * * *